US012776153B1

(12) United States Patent
Escandon

(10) Patent No.: US 12,776,153 B1
(45) Date of Patent: Oct. 27, 2026

(54) LABEL MAKER FOR IMAGE SEGMENTATION MODELS

(71) Applicant: United Service Automobile Association (USAA), San Antonio, TX (US)

(72) Inventor: Rodrigo Escandon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 592 days.

(21) Appl. No.: 18/082,316

(22) Filed: Dec. 15, 2022

Related U.S. Application Data

(60) Provisional application No. 63/291,748, filed on Dec. 20, 2021.

(51) Int. Cl.
*G06V 20/70* (2022.01)
*G06V 20/10* (2022.01)

(52) U.S. Cl.
CPC ............ *G06V 20/70* (2022.01); *G06V 20/176* (2022.01); *G06V 20/188* (2022.01)

(58) Field of Classification Search
CPC ...... G06V 20/70; G06V 10/764; G06V 10/26; G06V 20/176; G06V 20/10–188; G06V 20/13; G06V 20/17; G06V 10/143; G06V 10/82; G06T 7/10–13; G06T 2207/30181–30188; G06T 2207/10032; G06T 2207/10048; G06T 17/05; G06T 2207/20081; G06F 16/587; G06F 16/29; G06F 40/169; G01C 21/3852; G01C 11/02; G06N 3/02–105
See application file for complete search history.

(56) References Cited

U.S. PATENT DOCUMENTS

| | | | | |
|---|---|---|---|---|
| 11,049,044 | B1 * | 6/2021 | Habenschuss | G06N 3/08 |
| 11,074,447 | B1 * | 7/2021 | Fox | G05D 1/0094 |
| 2006/0095207 | A1 * | 5/2006 | Reid | G01S 11/12<br>348/148 |
| 2011/0033110 | A1 * | 2/2011 | Shimamura | G06T 7/55<br>382/173 |
| 2015/0135114 | A1 * | 5/2015 | Zhang | G01C 21/367<br>715/771 |
| 2018/0260626 | A1 * | 9/2018 | Pestun | G08G 5/80 |
| 2022/0180016 | A1 * | 6/2022 | Jenks | G06F 30/13 |

* cited by examiner

*Primary Examiner* — Gregory A Morse
*Assistant Examiner* — Stefano Anthony Daradano
(74) *Attorney, Agent, or Firm* — Fletcher Yoder, P.C.

(57) ABSTRACT

The current disclosure is directed to a label maker for image segmentation models. The label maker may include receiving aerial image data corresponding to a target property and labeling vegetation and/or structures within the aerial image data based on normalized difference vegetation index (NDVI) and digital surface model (DSM) image data and analysis. The labeled aerial image data may be sent to a machine learning model to train the machine learning model to label aerial image data for vegetation and/or structures.

18 Claims, 3 Drawing Sheets

LABEL MAKER FOR IMAGE SEGMENTATION MODELS

CROSS REFERENCED TO RELATED APPLICATIONS

The present application claims priority to and the benefit of U.S. Provisional Application No. 63/291,748, entitled "LABEL MAKER FOR IMAGE SEGMENTATION MODELS" and filed on Dec. 20, 2021, the disclosure of which is incorporated by reference herein in its entirety for all purposes.

BACKGROUND

The present disclosure relates generally to a label maker for segmenting images according to vegetation and structures in image data. The present disclosure relates more specifically to systems and methods of labeling vegetation and/or structures within the image data based on analyzing infrared images and image height data. The labels are then used to develop machine learning models for labeling vegetation and structures within image data.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

The amount of vegetation and/or structures surrounding a property may impact certain insurance policies (e.g., homeowners' insurance) associated with the property. An insurance provider may obtain aerial images of a property and may manually label parts of the aerial image to categorize vegetation and/or structures around the property. It may be time consuming for the insurance provider to manually label every tree, shed, and other structure or vegetation around the property. Therefore, it may be beneficial to use a labeling system that automatically labels vegetation and structures surrounding a property based on detected vegetation characteristics by applying a normalized difference vegetation index (NDVI) to the images and analyzing image height data using Digital Surface Model (DSM) data, rather than the insurance provider manually labeling segments of the aerial property image.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
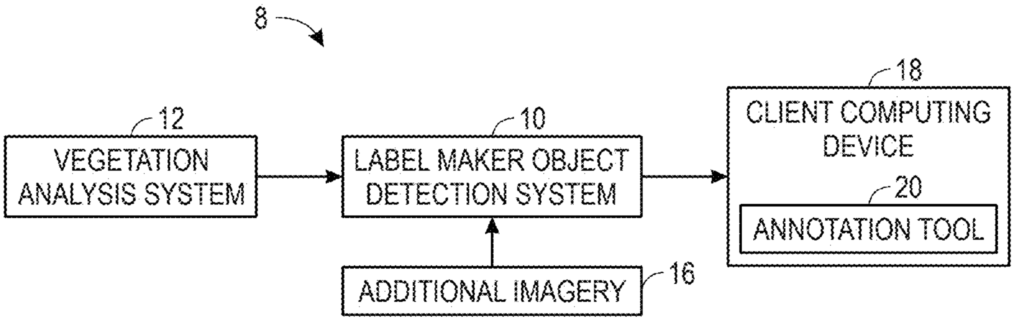
FIG. 1 illustrates an automated labeling system for aerial images, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, insurance providers may need to evaluate aerial image data corresponding to one or more properties associated with the insurance provider. The insurance provider may need to outline and manually label vegetation and structures within segments of the aerial image data. The process of manually labeling the vegetation, structures, and other elements within segments of the aerial image data may be time consuming for the insurance company. However, it is now recognized that various advantages may be gained by automating the labeling process by applying a normalized difference vegetation index (NDVI) to aerial images and using digital surface model (DSM) data methods to assign labels to vegetation and structures within segments of the aerial image data automatically. NDVI creates an index indicative of likelihood of vegetation by measuring a difference between a vegetation reflectant (e.g., near-infrared light signals) and a vegetation absorbant (e.g., red light signals). The generated indices are used to differentiate structures from vegetation. For example, when an index is within a first range (e.g., −1 to near zero) this may indicate likely water. When an index is within a second range (e.g., near zero), this may indicate structures. When an index is within a third range (e.g., near zero to 1) this may indicate likely vegetation. Further, the DSM application may look at a distance (e.g., indicated by infrared reflection) to discern a height of features within the aerial images, where certain height ranges (especially when considering shapes) may indicate structures versus vegetation.

Accordingly, the present embodiments relate to automating the labeling process of structures and vegetation within aerial image data using the combination of the NDVI and DSM image analysis methods so they can be used for building machine learning models. The machine learning models may be given training data that includes aerial image data that has been labeled to identify segments of vegetation and/or structures within the images. The machine learning model may utilize the past image data to detect patterns within vegetation and structures around properties based on geographical location of properties, time of year image data was collected, and the like. The machine learning models may receive aerial image data and label structures and vegetation within the image data based on past data results and recognized patterns within the past data.

Additionally, the output of the labeling from the combination of the NDVI and DSM image analysis methods may be sent to an annotation tool 20 that displays the labeled aerial image data on a user interface along with displaying the labels within the image and whether they correspond to structures or vegetation. A user may then conduct changes and/or implement additions to the labeled image data based on the results using the user interface. The user may include a client of an insurance company, an insurance company employee, a government employee, and the like.

With the foregoing in mind, FIG. 1 illustrates a block diagram of an automated labeling system 8 for aerial images, in accordance with an embodiment of the present disclosure. The automated labeling system 8 may include a label maker object detection system 10 that is used to label vegetation, structures, and other segments within the aerial image data. The automated labeling system 8 may also include a vegetation analysis system 12, additional imagery 16, and a client computing device 18 that includes an annotation tool 20.

The label maker object detection system 10 may receive aerial image data from a vegetation analysis system 12 that may have retrieved requested aerial image data corresponding to one or more coordinates of a target property, in response to receiving a request to update image data for the target property. The target property may correspond to a property of interest that an interested party (e.g., insurance provider) may want to be labeled for vegetation and structures. The insurance provider may then use these labels to create machine learning models to enhance its home evaluation capabilities. By doing this they then can implement insurance policy modifications based on the amount of vegetation and/or structures that surround a property. The label maker object detection system 10 may be used to label aerial images to identify vegetation and/or structures based on aerial image data that include digital surface data and infrared data by applying a threshold height based on this data. The label maker object detection system 10 provides the labels that may be used to train machine learning models that may enable vegetation and/or structures to be identified regardless of whether elevation and/or infrared data for the aerial images is available.

The label maker object detection system 10 may utilize the digital surface image data and infrared image data to segment and label the images according to elevation of the vegetation and structures and may only label vegetation and structures above certain height thresholds (e.g., 7 feet height threshold for vegetation, 12 feet height threshold for structures), while detecting vegetation in infrared images by applying the NDVI. The label maker object detection system 10 may send labeled aerial images to one or more machine learning models to train the one or more machine learning models to label aerial image data.

The label maker object detection system 10 may also receive additional aerial image data that may correspond to properties of interest (e.g., properties that an insurance provider wants to analyze for vegetation and structures). The additional aerial image data may be additional image data from nearby properties that may be used to predict structure and vegetation at the property of interest, based on the label maker object detection system 10 evaluation of the data.

The label maker object detection system 10 may label the data received from the vegetation analysis system 12 for structures and/or vegetation. The labeling may include outlining the structures and/or vegetation within the aerial image data using different color outlines to distinguish the vegetation from the structures. Additionally, the label maker object detection system 10 may label structures and vegetation above a threshold height value. The label maker object detection system 10 may then send the labeled aerial image data to a client computing device 18 that includes an annotation tool 20. The annotation tool 20 may be an application that can be used and display a user interface on the client computing device 18. The client may be an insurance provider, a customer of the insurance provider, and the like. The client may then use the annotation tool 20 to view the aerial image data with the labels included and may make updates and/or adjustments to the labels within the image data. The client may outline additional structures and/or vegetation within the image data and/or may edit existing labels to expand the labels to include more vegetation and/or structures and/or remove the labels within the labeled aerial image.

The process of automating the labeling of structures and vegetation within aerial image data enables more efficient analysis of the data and reduces time of labeling. It should be understood that the label maker object detection system 10 may be used continually update the machine learning models based on the received aerial image data corresponding to target properties, and the labels added to the target properties by the label maker object detection system 10.

Figure 2:
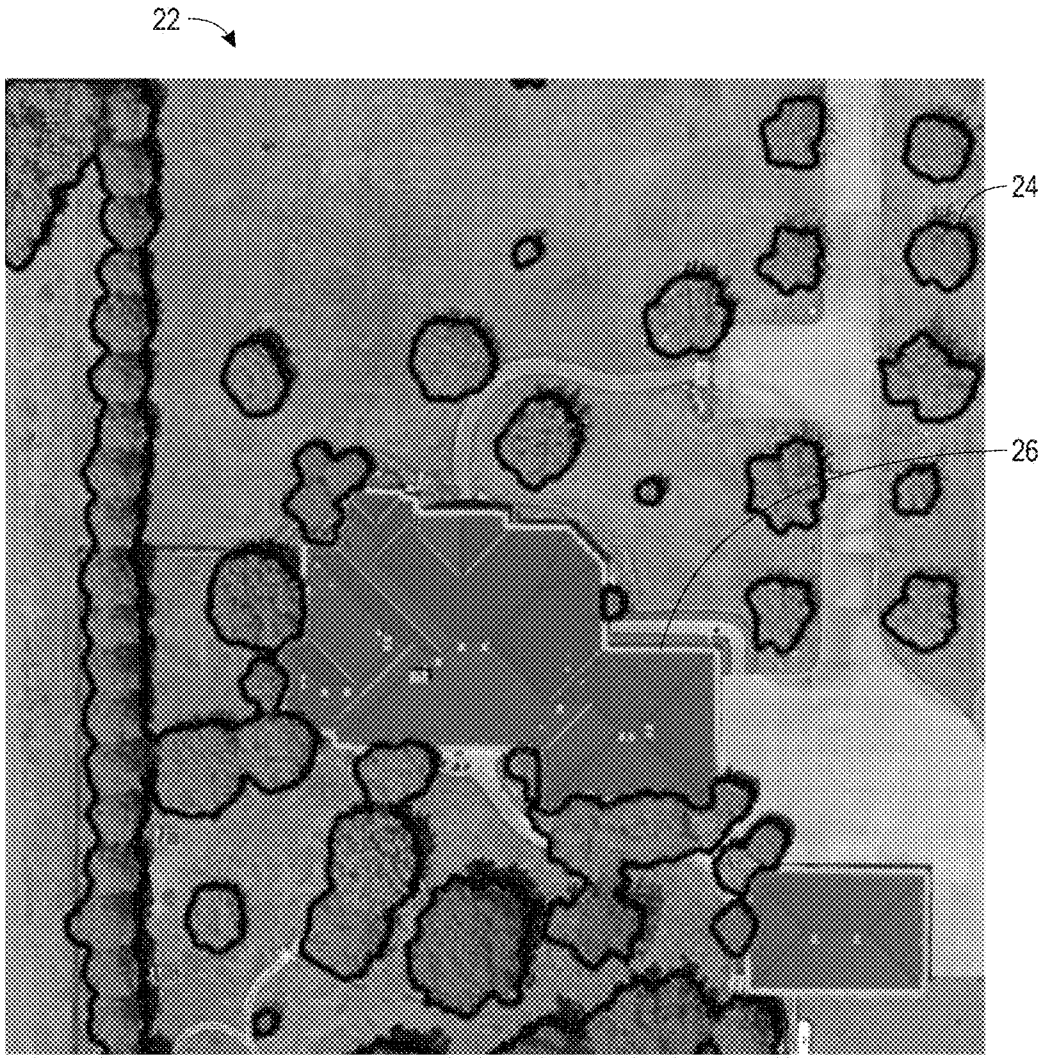
FIG. 2 illustrates a labeled aerial image including labels for vegetation and structures within the aerial image, in accordance with an embodiment of the present disclosure.

With the foregoing in mind, FIG. 2 illustrates a labeled aerial image 22 including labels for vegetation 24 and structures 26 within the aerial image, in accordance with an embodiment of the present disclosure. The label maker object detection system 10 may receive an aerial image from the vegetation analysis system 12 and may output the labeled aerial image 22. The labels may correspond to the vegetation 24, structures 26, or other identifiable objects within segments of the labeled aerial image 22.

The labeled aerial image 22 may include outlining around the vegetation 24 and/or the structures 26 within the aerial image. The outline color may correspond to a category of identification (e.g., vegetation, structure) within the labeled aerial image 22. For example, the vegetation 24 identified in the image by the label maker object detection system 10 based on a combination of the NDVI, DSM data, and other image analysis methods that may be outlined using a green outline color, and the structures 26 within the image may be outlined by a red outline color. It should be understood that any suitable outline color may be used to outline structures and/or vegetation within the image. Further, the label maker object detection system 10 may outline different structures within the image with different colors based on type and/or category of the structures. For example, the main property (e.g., house townhouse) of interest within the aerial image may be outlined in a blue outline and other properties around the image (e.g., garage, shed) may be outlined in a red outline. This may enable the client to distinguish between certain structures within the image. The label maker object detection system 10 may recognize that structures above a certain height within the aerial image may be able to outline structures according to the category of the structure 26.

Further, the label maker object detection system 10 may be able to identify and outline the structures 26 within the aerial image that correspond to a certain height threshold based on the DSM data related to heights of the vegetation 24 and the structures 26 within the data. For example, the label maker object detection system 10 may outline the vegetation 24 above 7 feet and the structures 26 above 10 feet. It should be understood that any suitable height threshold may be implemented by the object detection system 10, based on past digital surface data and other elevation data received by the label maker object detection system 10. The labeled aerial image 22 output from the label maker object detection system 10 may be then sent to a client device, or other electronic device associated with the aerial image data for further analysis and/or reference.

Figure 3:
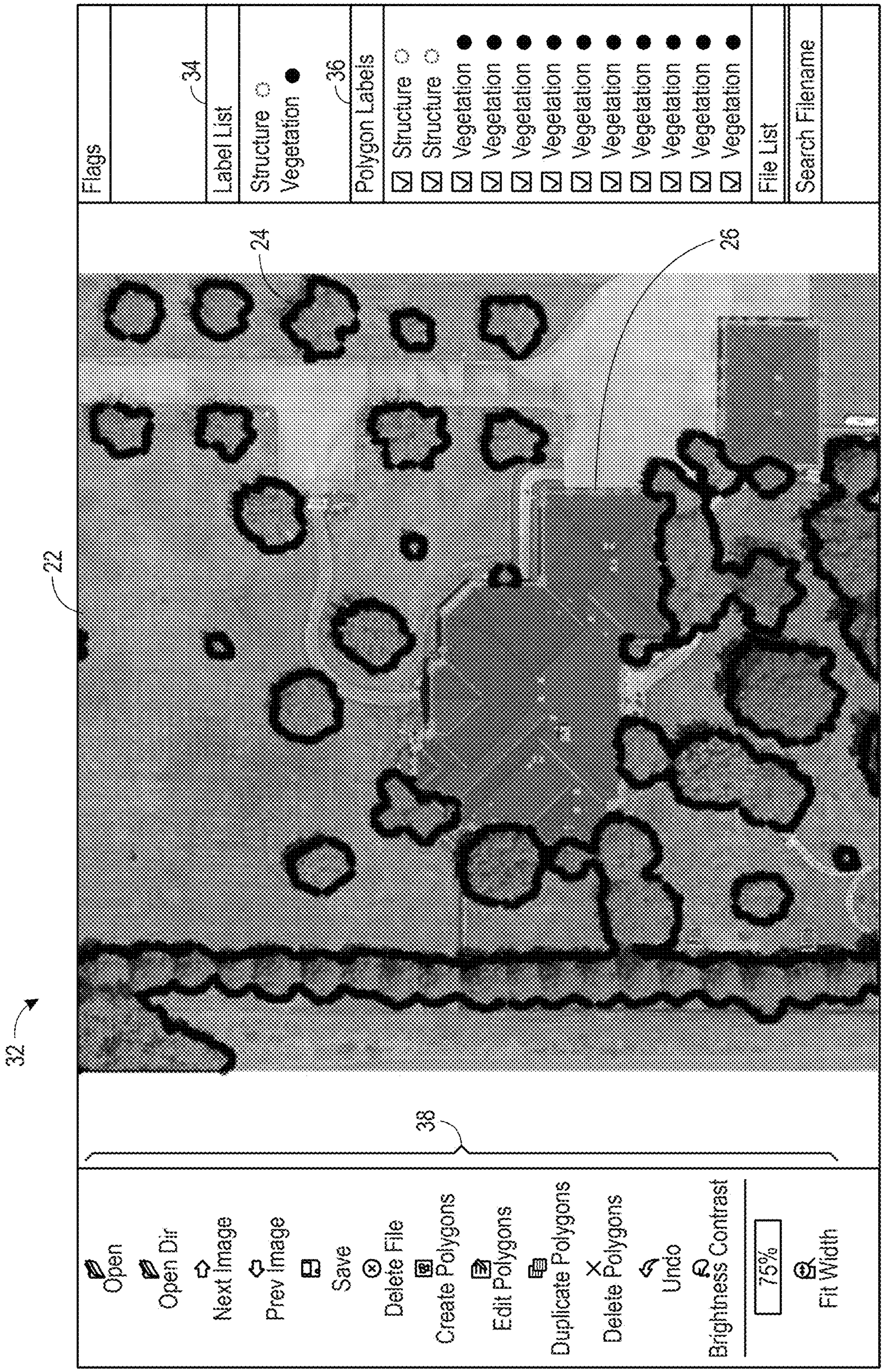
FIG. 3 illustrates a user interface for annotating the labeled aerial image of FIG. 2, in accordance with an embodiment of the present disclosure.

With the foregoing in mind FIG. 3 illustrates a user interface 32 for annotating the labeled aerial image 22 of FIG. 2, in accordance with an embodiment of the present disclosure. The label maker object detection system 10 results may be transmitted to a client computing device 18 for display using the annotation tool 20 which may be an application on the client computing device 18 that may display the labeled aerial image 22 along with tools to modify the aerial image via the user interface 32.

For example, the annotation tool 20 may include a user interface 32 that displays the labeled aerial image 22, along with a label list 34 which includes a listing of each label used and a color used for each label. For example, identified vegetation within the image may be identified in the label list and may display a green dot next to the vegetation label to signify that the areas outlined in green within the labeled aerial image correspond to the vegetation 24. The user interface 32 may also display a list of polygon labels 36 that lists all the outlined vegetation 24 and/or structures 26 in the image. The user may check and/or uncheck the polygon labels 36 to display and/or remove labels around the vegetation 24 and/or the structures 26 identified within the labeled aerial image 22 to view each labeled structure individually or in groups. For example, the user may view the labeled vegetation 24 and not the structures 26, by unchecking the structure 26 labels within the polygon labels 36. This may enable analysis of the vegetation 24 and/or the structures 26 separately within the labeled aerial image 22.

Additionally, the annotation tool 20, may include a tool list 38 that may enable the user to delete a labeled aerial image, create labels around segments of the image that may not be identified by the label maker object detection system 10, and edit segments of the image that have already been labeled by the label maker object detection system 10. For example, the user may realize that a section of the vegetation 24 that is desired for analysis is not currently labeled in the image and may create a polygon outline that includes the section of vegetation 24 the user wants to label in the image.

The annotation tool 20 enables the user to add labels, edit labels, and/or remove labels within the labeled aerial image 22. The user may also create additional labels and/or further categorize vegetation based on distance to the target property, and or area of the labeled image. It should be understood that the user may edit the labeled aerial image 22 using the annotation tool 20 in any suitable manner.

Figure 4:
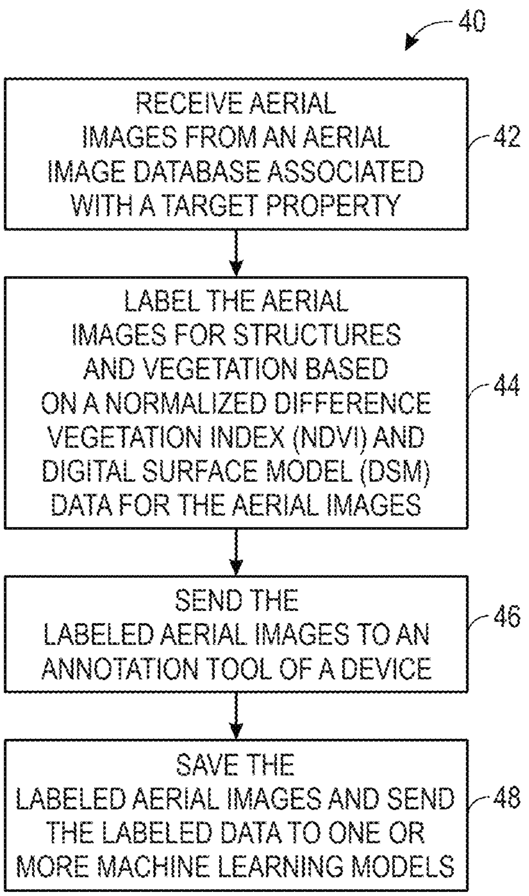
FIG. 4 illustrates a flow diagram of a method of labeling aerial images for vegetation and structures based on normalized difference vegetation index (NDVI) and digital surface data (DSM) image analysis processes to label images available for machine learning models, in accordance with an embodiment of the present disclosure.

With the foregoing in mind, FIG. 4 illustrates a flow diagram of a method 40 of labeling aerial images for vegetation and structures using a combination of the NDVI and DSM image analysis methods, in accordance with an embodiment of the present disclosure. The vegetation analysis system 12 may be associated with an insurance company and may retrieve aerial image data associated with a target property from a database, additional computing system, and the like. The vegetation analysis system 12 may then send the aerial image data to the label maker object detection system 10 for analysis and labeling of the vegetation 24 and/or the structures 26 within the aerial image based on the combination of the NDVI and DSM image analysis methods. The label maker object detection system 10 may then send the labeled aerial image 22 to a client device that includes an annotation tool 20 that the user may use to edit the labeled aerial image 22.

The automated labeling system 8, at block 42, receives a plurality of images from an aerial image database. The plurality of images may correspond to the location of one or more target properties and may be retrieved based on latitude and longitude coordinates corresponding to the target properties. The target properties may be associated with an insurance provider that covers the target property and/or is providing an insurance quote for the target property. The automated labeling system 8, at block 44, labels the plurality of images based on the combination of the NDVI and DSM image analysis methods. The labeling may include outlining the vegetation 24 and/or the structures 26 within the aerial property image, based on identifying the vegetation 24 and/or structures 26 using a combination of the NDVI applied to infrared aerial images, DSM data, and other image data. The object detection system 10 may filter the aerial images to label the vegetation 24 and the structures 26 corresponding to certain height thresholds based on DSM data.

The automated labeling system 8, at block 46, sends the label maker results to the annotation tool 20 of a device. The annotation tool 20 may be an application and/or software that runs on a user device associated with the target property. The annotation tool 20 may enable the user to edit and/or remove the labeled vegetation 24 and structures 26 within the labeled aerial images 22 and may also enable the user to add labels to other segments of the aerial image that are not yet labeled.

The automated labeling system 8, at block 48, saves the labeled aerial images 22 to a database associated with the automated labeling system 8, and enables the use of these images for the training of one or more machine learning models based on the labeled aerial images 22. This enables the machine learning models to constantly update based on new labeled aerial image data 22. It should be understood, that in some embodiments the labeled aerial images 22 may be analyzed directly by an insurance provider for the vegetation 24 and/or structures 26 surrounding a property to determine an insurance modification without the use of an annotation tool 20.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that features discussed with references to different examples provided herein may be combined. Features shown and described with reference to FIGS. 1-4 may be combined in any suitable manner.

The invention claimed is:

1. A system, comprising:

a label maker object detection computer system, configured to:

receive aerial images associated with a target property;

apply a Normalized Difference Vegetation Index (NDVI) to the aerial images, Digital Surface Model (DSM) or both to the aerial images to identify vegetation, contours of the vegetation, structures, and contours of the structures within the aerial images;

label the identified vegetation and the identified structures within the aerial images, while filtering structures under a first threshold height level comprising 12 feet and vegetation under a second threshold height level comprising 7 feet from the labelling; and save the labeled aerial images with an indication of the contours of the vegetation and the contours of the structures to a database for use by an annotation system.

2. The system of claim 1, wherein the label maker object detection computer system is configured to apply the NDVI to the aerial images by identifying, in one or more portions of the aerial images, a normalized difference between a vegetation reflectant and vegetation absorbant to identify an index representative of a likelihood of vegetation within the one or more portions of the aerial images.

3. The system of claim 2, wherein the label maker object detection computer system is configured to apply the NDVI to the aerial images by further using a value of the index to identify the contours of the vegetation, the contours of the structures, or both.

4. The system of claim 1, wherein the label maker object detection computer system is configured to apply the DSM to the aerial images by:

identifying a height of features in the aerial images based upon reflectance data of the aerial images; and identifying the features as a structure or vegetation based upon a range of the height of features.

5. The system of claim 4, wherein the label maker object detection computer system is configured to apply the DSM to the aerial images by:

identifying a shape of the features in the aerial images; and identifying the features based in part upon the shape of the features in the aerial images.

6. The system of claim 1, wherein the label maker object detection computer system is configured to label the vegetation and structures within the aerial image, by: further providing an outline within the aerial images that identifies the contours of the vegetation and the contours of the structures within the image.

7. The system of claim 6, wherein the outline comprises a first color indicating vegetation is identified and a second color, different than the first color, indicating structures are identified.

8. The system of claim 6, comprising an annotation application, wherein the annotation application is configured to receive the labeled aerial images and the annotation application comprises an editing tool to add labels, remove labels, modify labels, or any combination thereof from the aerial images.

9. The system of claim 1, comprising one or more machine learning models configured to identify the vegetation, the contours of the vegetation, the structures, and the contours of the structures in the aerial images via machine learning using the NDVI, the DSM, or both.

10. The system of claim 9, wherein the label maker object detection computer system is configured to train the one or more machine learning models based on the labeled aerial images saved within the database.

11. The system of claim 9, wherein the machine leaning models are configured to: utilize past image data to detect patterns that identify vegetation and structures based at least upon a geographical location, time of year, or both.

12. The system of claim 1, comprising a vegetation analysis computer system, configured to:

receive an indication of a target property for analysis via a graphical user interface;

select the aerial images from a plurality of aerial images, based upon identifying a subset of the plurality of aerial images associated with a geographical location of the target property; and provide the selected aerial images to the label maker object detection computer system.

13. The system of claim 12, wherein the vegetation analysis computer system is configured to:

distinguish the target property from other properties in the image based upon relative heights of the target property and the other properties; and label the target property with a first outline in a first color and the other properties with a second outline in a second color.

14. A computer-implemented method, comprising:

receiving aerial images associated with a target property;

applying, using machine learning, a Normalized Difference Vegetation Index (NDVI) to the aerial images, Digital Surface Model (DSM) or both to the aerial images to identify vegetation, contours of the vegetation, structures, and contours of the structures within the aerial images, wherein the machine learning is configured to utilize past image data to detect patterns that identify vegetation and structures based at least upon a geographical location, time of year, or both;

labelling the identified vegetation and the identified structures within the aerial images, while filtering structures under a first threshold height level comprising 12 feet and vegetation under a second threshold height level comprising 7 feet from the labelling; and saving the labeled aerial images with an indication of the contours of the vegetation and the contours of the structures to a database for use by an annotation system.

15. The computer-implemented method of claim 14, comprising applying the NDVI to the aerial images by:

identifying, in one or more portions of the aerial images, a normalized difference between a vegetation reflectant and vegetation absorbant to identify an index representative of a likelihood of vegetation within the one or more portions of the aerial images; and using a value of the index to identify the contours of the vegetation, the contours of the structures, or both.

16. The computer-implemented method of claim 14, comprising: applying the DSM to the aerial images by:

identifying a height and shape of features in the aerial images based upon reflectance data of the aerial images; and identifying the features as a structure or vegetation based upon a respective shape and range of the height of each feature of the features.

17. A tangible, non-transitory, computer-readable medium, comprising computer-readable instructions that, when executed by one or more processors, cause the one or more processors to:

receive aerial images associated with a target property;

apply, using machine learning, a Normalized Difference Vegetation Index (NDVI) to the aerial images, Digital Surface Model (DSM) or both to the aerial images to identify vegetation, contours of the vegetation, structures, and contours of the structures within the aerial images, wherein the machine learning is configured to utilize past image data to detect patterns that identify vegetation and structures based at least upon a geographical location, time of year, or both;

label the identified vegetation and the identified structures within the aerial images, while filtering from labelling structures under a first threshold height level and vegetation under a second threshold height level, while filtering structures under a first threshold height level comprising 12 feet and vegetation under a second threshold height level comprising 7 feet from the labelling; and save the labeled aerial images with an indication of the contours of the vegetation and the contours of the structures to a database for use by an annotation system.

18. The tangible, non-transitory, computer-readable medium of claim 17, comprising computer-readable instructions that, when executed by the one or more processors, cause the one or more processors to:

receive an indication of a target property for analysis via a graphical user interface; and select the aerial images from a plurality of aerial images, based upon identifying a subset of the plurality of aerial images associated with a geographical location of the target property;

distinguish the target property from other properties in the image based upon relative heights of the target property and the other properties; and label the target property with a first outline in a first color and the other properties with a second outline in a second color.

* * * * *